(12) United States Patent  
Aoki

(10) Patent No.: US 8,116,331 B2  
(45) Date of Patent: Feb. 14, 2012

(54) COMMUNICATION SYSTEM, NETWORK APPARATUS, COMMUNICATION RECOVERY METHOD FOR USE THEREIN, AND PROGRAM THEREOF

(75) Inventor: Hajime Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 12/496,077

(22) Filed: Jul. 1, 2009

(65) Prior Publication Data

US 2010/0002711 A1     Jan. 7, 2010

(30) Foreign Application Priority Data

Jul. 2, 2008    (JP) ................................ 2008-172857

(51) Int. Cl.
*H04L 12/28* (2006.01)
*H04L 12/56* (2006.01)
*H04L 1/00* (2006.01)
*H04L 12/26* (2006.01)
*H04J 3/16* (2006.01)
*H04J 3/22* (2006.01)

(52) U.S. Cl. ... 370/401; 370/230; 370/392; 370/395.53; 370/466

(58) Field of Classification Search .............. 370/230, 370/389, 392, 395.53, 401, 466
See application file for complete search history.

(56) References Cited

U.S. PATENT DOCUMENTS

| | | | |
|---|---|---|---|
| 2004/0133619 | A1 | 7/2004 | Zelig et al. |
| 2004/0184408 | A1 | 9/2004 | Liu et al. |
| 2005/0198383 | A1* | 9/2005 | Rose et al. ................... 709/245 |
| 2005/0220096 | A1 | 10/2005 | Friskney et al. |
| 2006/0146832 | A1 | 7/2006 | Rampal et al. |
| 2006/0274744 | A1* | 12/2006 | Nagai et al. .................. 370/389 |

FOREIGN PATENT DOCUMENTS

| | | | |
|---|---|---|---|
| EP | 0981226 | A | 2/2000 |
| EP | 1858213 | A | 11/2007 |
| EP | 2141867 | * | 1/2010 |
| JP | 2006229985 | A | 8/2006 |

OTHER PUBLICATIONS

European Search Report for EP 09 00 8564 completed Oct. 14, 2009.

* cited by examiner

*Primary Examiner* — Ronald Abelson

(57) ABSTRACT

The network apparatus (switch 10) of the communication system, which has the path table for registering a MAC address of the facing device which faces the device and a lending MAC address set in advance so as to be correlated with each other, and the MAC table for registering a MAC address inherent in a device connected to the apparatus itself, and path identification information for specifying a combination between a MAC address of a facing device in the path table to which the device is to refer and a lending MAC address so as to be correlated with each other, generates path identification information and registers the same at the path table when communicating through a pseudo wire, and resets the pseudo wire based on the path table and the MAC table when a device in communication is changed through the pseudo wire.

19 Claims, 7 Drawing Sheets

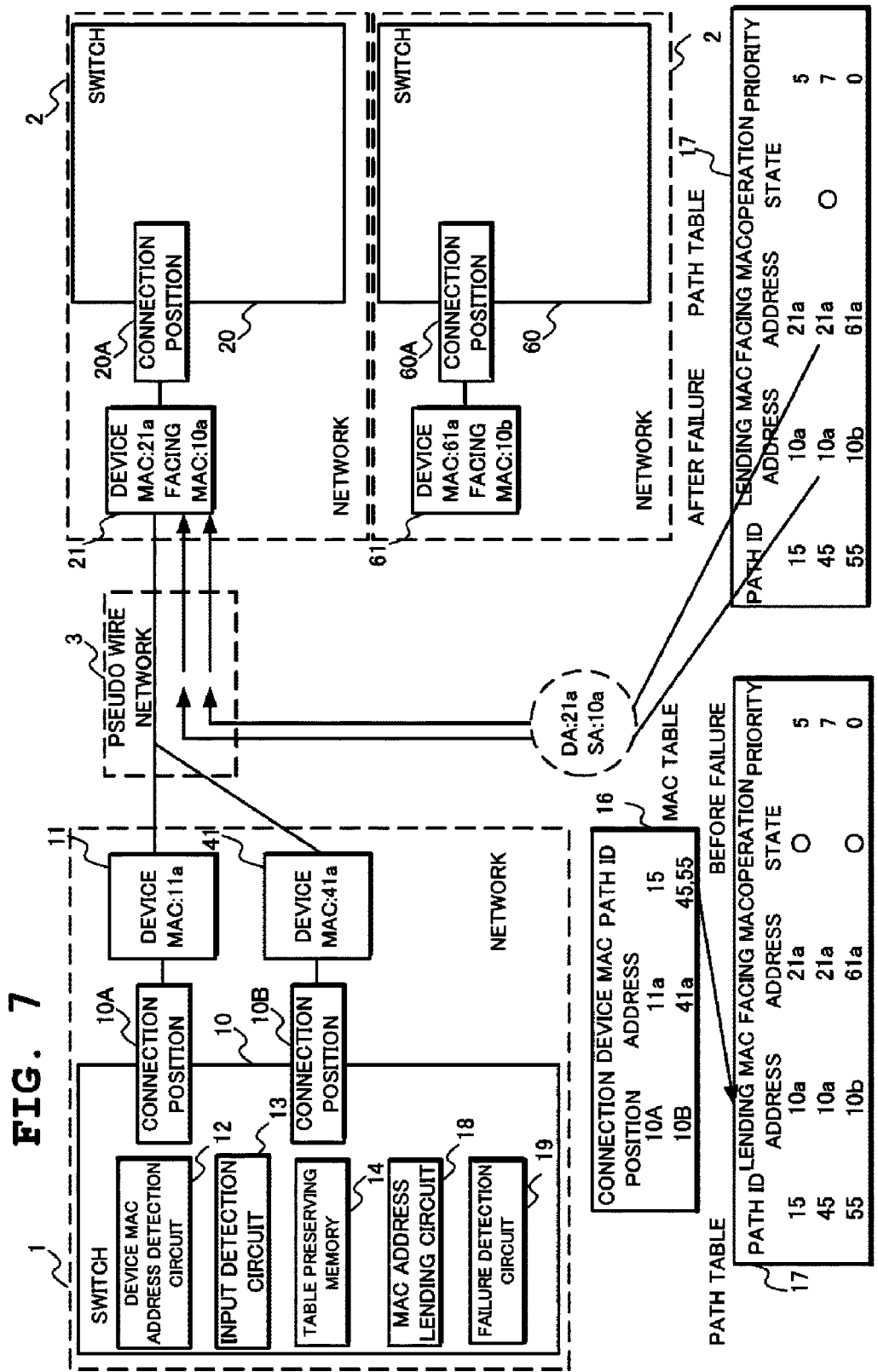

COMMUNICATION SYSTEM, NETWORK APPARATUS, COMMUNICATION RECOVERY METHOD FOR USE THEREIN, AND PROGRAM THEREOF

INCORPORATION BY REFERENCE

This application is based upon and claims the benefit of priority from Japanese patent application No. 2008-172857, filed on Jul. 2, 2008, the disclosure of which is incorporated herein in its entirety by reference.

TECHNICAL FIELD

The present invention relates to a communication system, a network apparatus, a communication recovery method for use therein, and a program thereof and, more particularly, a pseudo wire such as a frame relay (FR).

BACKGROUND ART

Service providers provide ATM (Asynchronous Transfer Mode) service by using ATM communication infrastructure and provide frame relay service by using frame relay communication infrastructure. Setting up dedicated communication infrastructure for each service, however, will require enormous cost.

Under these circumstances, service providers adopt a method of providing ATM service on MPLS (Multi Protocol Label Switching) communication infrastructure by setting up ATM and frame relay pseudo wires on MPLS.

Expansion of this concept of pseudo wire to Ethernet (registered trademark) is VPLS (Virtual Private LAN (Local Area Network) Service). VPLS is a technique for providing L2 (Layer 2) service on MPLS.

Relay wire or the like for the wide area Ethernet (registered trademark) uses PWE3 (Pseudo Wire Emulation Edge to Edge) technique (see e.g. Patent Literature 1).

The PWE3 technique is a technique for emulating the Ethernet (registered trademark) on the MPLS network for transmission. MPLS is a technique for providing the IP (Internet Protocol) network with concept of a path by executing transfer based on a label attached to a packet in place of an IP address.

For setting up the above-described pseudo wire on MPLS, it is necessary to know a MAC (Media Access Control) address of a facing device. There exist ARP (Address Resolution Protocol) and the like as a method of knowing a MAC address of a facing device when including an L3 (layer 3).

When limiting to an L2 layer, however, there exists no method of automatically obtaining a MAC address inherent in a facing device. In a communication mode using only an L2 layer, every time a failure occurs, configuration is re-set using a MAC address inherent in a device to which a facing device belongs. Re-setting of configuration involves troublesome re-setting because of physical long distance of a facing device and such human mistakes as erroneous read of a MAC address inherent in a device and as erroneous input at the time of configuration setting.

Patent Literature 1: Japanese Patent Laying-Open No. 2006-229985.

For setting up the above-described pseudo wire, there exists no method of automatically obtaining a MAC address inherent in a facing device when limiting to an L2 layer. Therefore, configuration using an inherent MAC address should be set by initial setting at both devices facing to each other, so that the configuration setting needs to be executed for the facing devices every time a MAC address inherent in a device used changes.

Thus, it is possible that pseudo wire configuration setting might not be executed with ease because it should be executed every time a MAC address inherent in a device changes and because a setting destination is a facing device at the time of setting up a pseudo wire to have a physically long distance. Further problem is a human error such as erroneous input at the time of setting configuration because an inherent MAC address which is unique cannot be determined unless the device itself is referred to.

Under these circumstances, an object of the present invention is to solve the above-described problems and provide a communication system, a network apparatus, a communication recovery method for use therein, and a program thereof which enable communication with a facing side to be recovered only by changing a data base of a switch on a transmission side.

SUMMARY

According to a first exemplary aspect of the invention, a communication system including a network apparatus for controlling communication through a pseudo wire between facing devices, the network apparatus comprising a path table in which a MAC (Media Access Control) address of a facing device which faces a device connected to the apparatus itself and a lending MAC address set in advance for the pseudo wire are registered in correlation with each other, a MAC table in which a MAC address inherent in a device connected to the apparatus itself, and path identification information for specifying a combination between a MAC address of the facing device in the path table to which the device is to refer and the lending MAC address are registered in correlation with each other, and a unit which generates the path identification information and registers the information at the path table at the time of communication through the pseudo wire, wherein when a device in communication through the pseudo wire has a change, the network apparatus resets the pseudo wire based on the path table and the MAC table.

According to a second exemplary aspect of the invention, a network apparatus for controlling communication through a pseudo wire between facing devices, comprising a path table in which a MAC (Media Access Control) address of a facing device which faces a device connected to the apparatus itself and a lending MAC address set in advance for the pseudo wire are registered in correlation with each other, a MAC table in which a MAC address inherent in a device connected to the apparatus itself, and path identification information for specifying a combination between a MAC address of the facing device in the path table to which the device is to refer and the lending MAC address are registered in correlation with each other, and a unit which generates the path identification information and registers the information at the path table at the time of communication through the pseudo wire, wherein when a device in communication through the pseudo wire has a change, resets the pseudo wire based on the path table and the MAC table.

According to a third exemplary aspect of the invention, a communication recovery method for use in a network apparatus for controlling communication through a pseudo wire between facing devices, wherein the network apparatus includes a path table in which a MAC (Media Access Control) address of a facing device which faces a device connected to the apparatus itself and a lending MAC address set in advance for the pseudo wire are registered in correlation with each other, a MAC table in which a MAC address inherent in a device connected to the apparatus itself, and path identification information for specifying a combination between a MAC address of the facing device in the path table to which the device is to refer and the lending MAC address are registered in correlation with each other, and which including a step of generating the path identification information and registering the information at the path table when communication through the pseudo wire is executed, wherein in the network apparatus, when a device in communication through the pseudo wire has a change, the pseudo wire is reset based on the path table and the MAC table.

According to a fourth exemplary aspect of the invention, a computer readable medium storing a program to be executed by a central processing device in a network apparatus for controlling communication through a pseudo wire between facing devices, wherein the network apparatus includes a path table in which a MAC (Media Access Control) address of a facing device which faces a device connected to the network apparatus and a lending MAC address set in advance for the pseudo wire are registered in correlation with each other, and a MAC table in which a MAC address inherent in a device connected to the network apparatus, and path identification information for specifying a combination between a MAC address of the facing device in the path table to which the device is to refer and the lending MAC address are registered in correlation with each other, wherein the program includes a processing of generating the path identification information and registering the information at the path table when communication through the pseudo wire is executed, and causes the network apparatus to reset, when a device in communication through the pseudo wire has a change, the pseudo wire based on the path table and the MAC table.

With thus-described structure and operation, the present invention attains the effect of recovering communication with a facing side only by changing a data base of a switch on a transmission side.

BRIEF DESCRIPTION OF THE DRAWINGS

FIG. 7 is a block diagram showing an example of a structure of a communication system according to a third exemplary embodiment of the present invention.

EXEMPLARY EMBODIMENT

Next, an exemplary embodiment of the present invention will be described with reference to the drawings. First, outlines of a communication system according to the present exemplary embodiment of the present invention will be described. The present invention relates to a method of automatically recovering communication by using only an L2 (Layer 2) when a device in pseudo wire operation is changed (in communication through a pseudo wire).

The communication system according to the present exemplary embodiment of the present invention is characterized in that when a device in pseudo wire operation is changed, pseudo wire setting which is caused by a change of an inherent MAC address using only an L2 layer is automatically re-set by in advance generating a path table in which a MAC (Media Access Control) address of a facing device to which a device is connected and a MAC address held by the system (a lending MAC address set in advance for pseudo wire) are correlated and a MAC table in which a MAC address inherent in a device and a path ID (Identifier) indicative of an element in the path table to which the device should refer are correlated.

Figure 1:
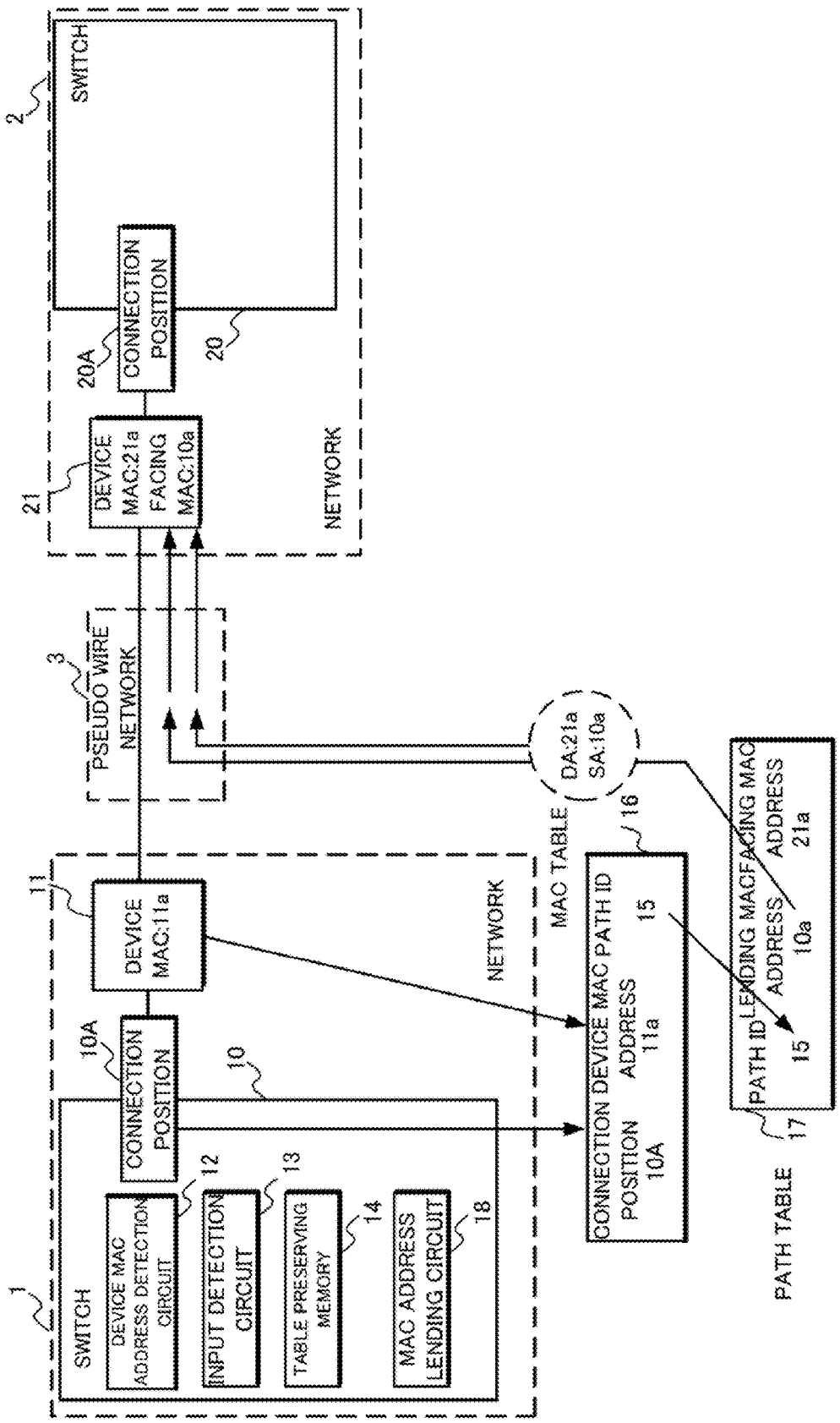
FIG. 1 is a block diagram showing an example of a structure of a communication system according to a first exemplary embodiment of the present invention.

FIG. 1 is a block diagram showing an example of a structure of a communication system according to a first exemplary embodiment of the present invention. In FIG. 1, a device 11 belonging to a network 1 has an inherent MAC address 11a and is connected to a connection position 10A of a switch 10. The connection condition is detected by a device MAC address detection circuit 12 and is automatically set at a MAC table 16.

When executing pseudo wire operation (communication through a pseudo wire), a facing MAC address 21a is set as a MAC address of a facing device 21 of a pseudo wire network 3 [network such as an MPLS (Multi Protocol Label Switching) network in which a pseudo wire is set] and a path ID 15 is set at a path table 17. This setting is detected by an input detection circuit 13 and the MAC table 16 and the path table 17 are preserved in a table preserving memory 14.

Upon setting of a path ID, an inherent MAC address 10a preserved by the switch 10 is automatically assigned to the path ID 15 as a lending MAC address by a MAC address lending circuit 18 to complete the path table 17 and the MAC table 16. The MAC table 16 is formed of a connection position, a device MAC address and a path ID, and the path table 17 is formed of a path ID, a lending MAC address and a facing MAC address.

Since as a facing MAC address of the device 21, the lending MAC address 10a is set, even when a device whose inherent MAC address is different is connected to the connection position 10A in place of the device 11, pseudo wire setting is automatically recovered by automatic updating of the MAC table 16.

In the present exemplary embodiment, the path table 17 is generated by adding, to the switch 10 of the network 1 to which the device 11 belongs, a lending MAC address which the switch 10 can manage and when executing communication, adding a lending MAC address and a facing device MAC address, and a path ID for specifying a combination of these addresses. Also in the present exemplary embodiment, the MAC table 16 is generated having a combination of a connection position of the switch 10, an inherent MAC address of the device 11 and a path ID.

In the MAC table 16, a relationship between a connection position of the switch 10 and an inherent MAC address of the device 11 is automatically updated every time the inherent MAC address of the device 11 is changed.

In the present exemplary embodiment, upon assignment of a path ID used in the path table 17 to the MAC table 16, the device 11 connected to the switch 10 starts communication with the facing device 21.

It is also structured such that when the device 11 under the control of the switch 10 communicates with other device 21, use of a lending MAC address managed by the switch 10 based on the path table 17 prevents a change of an inherent MAC address of the device 11 from affecting the outside of the device, so that communication with a facing device is automatically recovered upon updating of the MAC table 16.

Furthermore, detailed description will be made of the communication system and a network apparatus (e.g. the switch 10) according to the present exemplary embodiment with reference to FIG. 1.

In the network 1, there exist the switch 10, and the device 11 managed by the switch 10, and the device 11 is connected to the connection position 10A of the switch 10. In a network 2 facing the network 1, there exist a switch 20, and the device 21 managed by the switch 20, and the device 21 is connected to a connection position 20A of the switch 20. Furthermore, the network 1 and the network 2 are connected through the pseudo wire network 3.

The switch 10 has the connection position 10A (e.g. port) and is formed of the device MAC address detection circuit 12, the input detection circuit 13, the table preserving memory 14 and the MAC address lending circuit 18.

The path table 17 has registration of three elements as information about connection between the device 11 and the device 21, a connection source MAC address [SA (Source Address)] (lending MAC address), a connection destination MAC address [DA (Destination Address)] (facing MAC address) and the path ID 15 as an ID indicative of a combination of these addresses.

At a stage of generation of the path ID 15, the MAC address 10a held by the switch 10 will be made a lending MAC address by the MAC address lending circuit 18, and the MAC address 21a of the device 21 will be set as a facing MAC address.

In the MAC table 16, upon connection between the switch 10 and the device 11, the connection position 10A and the device MAC address 11a will be recited in the items of the connection position and the device MAC address, respectively, and the path ID 15 will be additionally set.

The MAC table 16 is allowed to refer to the path table 17 by using the path ID 15 and for the communication by the device 11, the facing MAC address 21a is used as a connection destination and the lending MAC address 10a is used as a connection source. Set to the device 21 are the facing MAC address 10a as a connection destination and the MAC address 21a inherent in the device as a connection source.

Figure 2:
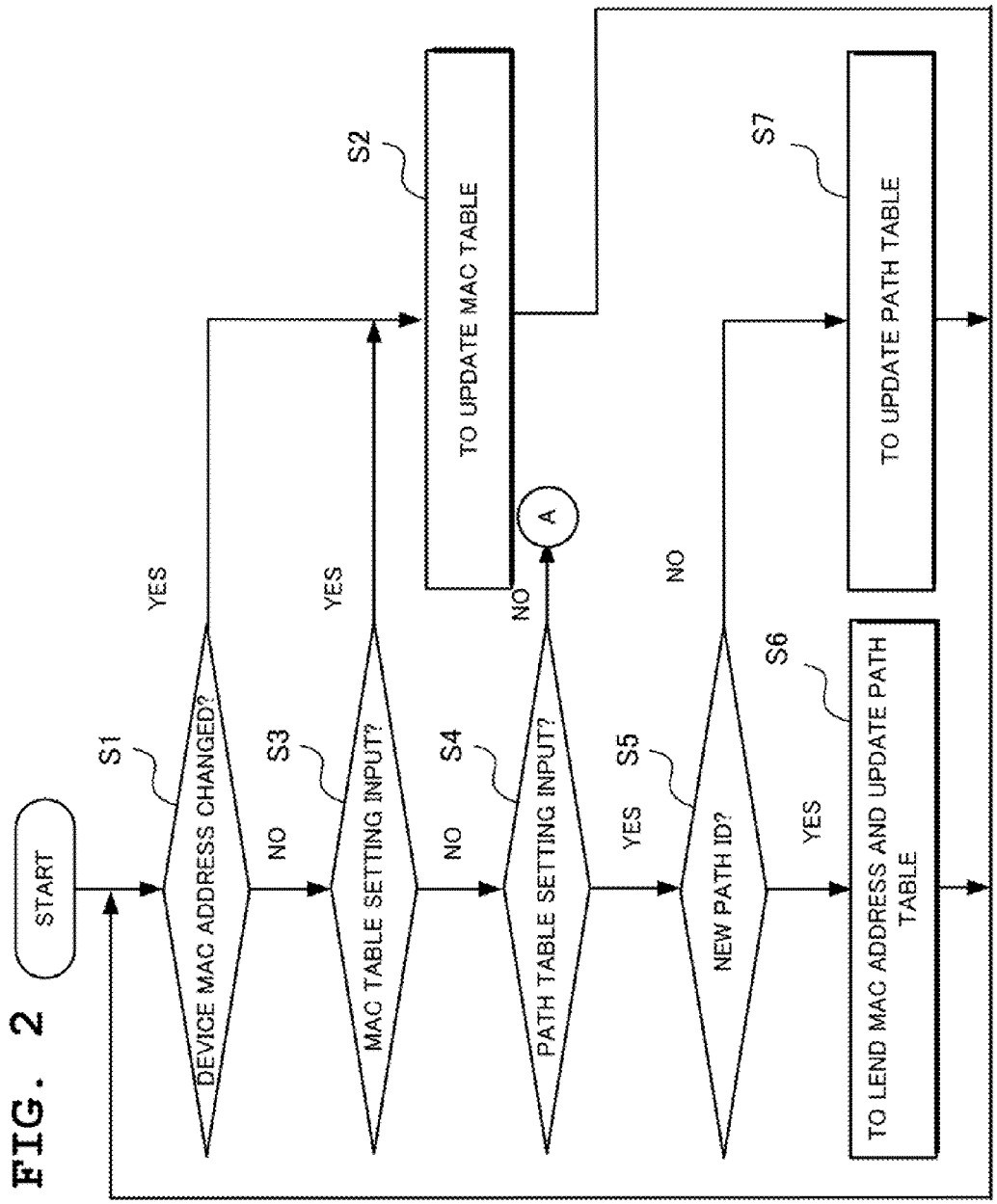
FIG. 2 is a flow chart showing operation of a switch 10 according to the first exemplary embodiment of the present invention.
Figure 3:
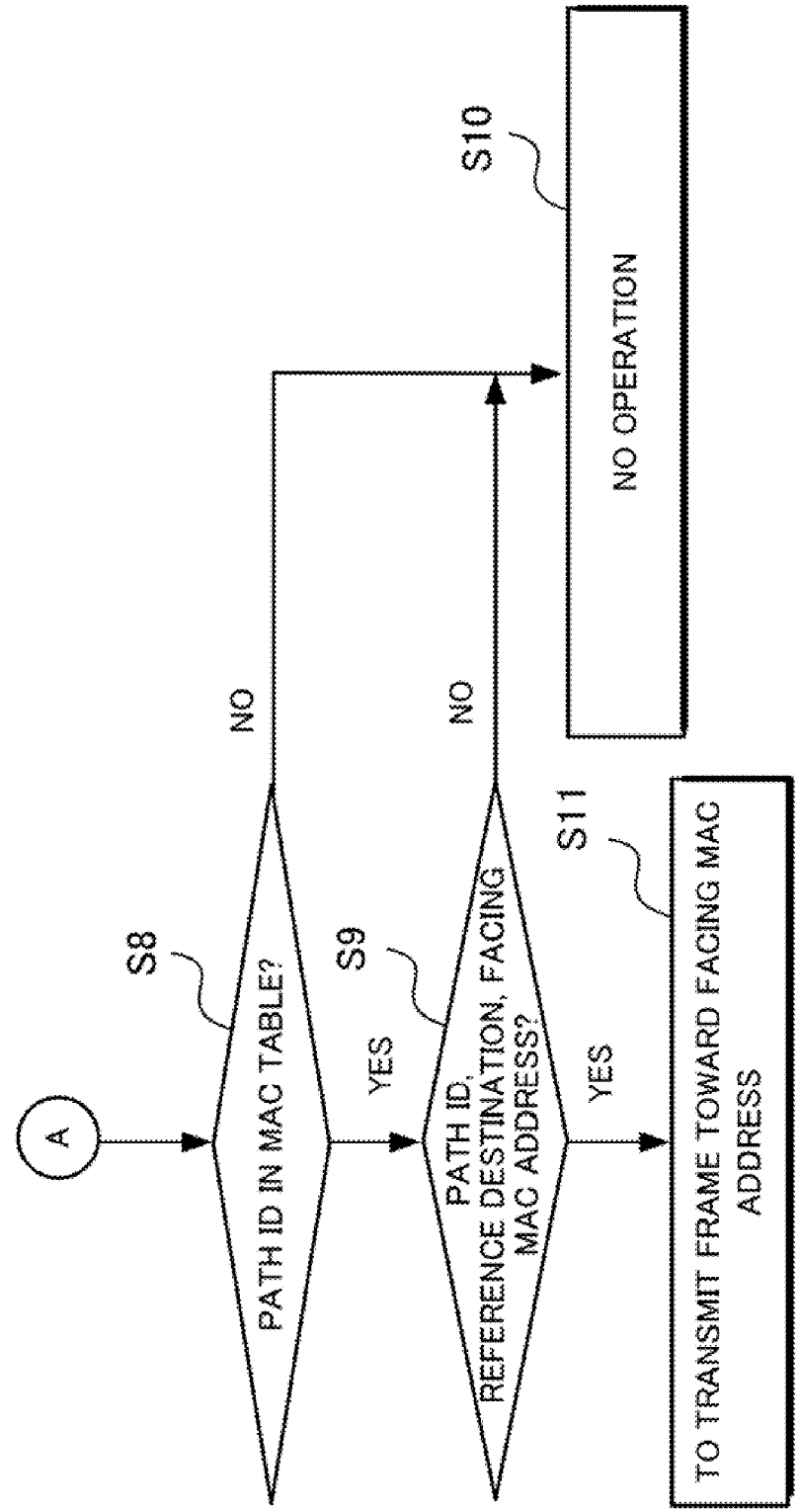
FIG. 3 is a flow chart showing operation of the switch 10 according to the first exemplary embodiment of the present invention.

FIG. 2 and FIG. 3 are flow charts showing operation of the switch 10 according to the first exemplary embodiment of the present invention. With reference to FIG. 1 and FIG. 2, operation of the switch 10 according to the first exemplary embodiment of the present invention will be described.

The device MAC address detection circuit 12 constantly monitors the MAC address of the connected device 11 (Step S1 in FIG. 2) and every time the MAC address is changed, accesses the MAC table 16 to update the registration contents (Step S2 in FIG. 2).

The input detection circuit 13 monitors setting input of the MAC table 16 (Step S3 in FIG. 2) and when the MAC table 16 has a change, accesses the MAC table 16 to update the registration contents (Step S2 in FIG. 2).

The input detection circuit 13 monitors setting input of the path table 17 (Step S4 in FIG. 2) and when the path table 17 has a change, determines whether its path ID is new or not (Step S5 in FIG. 2) and when it is a new path ID, lends a MAC address by means of the MAC address lending circuit 18 to access the path table 17 and update its registration contents (Step S6 in FIG. 2). When it is not a new path ID, the input detection circuit 13 only updates the registration contents of the path table 17 (Step S7 in FIG. 2).

When the device MAC address detection circuit 12 and the input detection circuit 13 fail to detect anything, if a path ID is set in the MAC table 16 of the table preserving memory 14 (Step S8 in FIG. 3), the switch 10 refers to the path table 17 to determine whether a facing MAC address is set (Step S9 in FIG. 3).

When the above-described Step S6 or Step S7 misses setting (Steps S8 and S9 in FIG. 3), the switch 10 refrains from executing operation (Step S10 in FIG. 3). When a facing MAC address is set, the switch 10 transmits a frame toward the address in question (Step S11 in FIG. 3).

Figure 4:
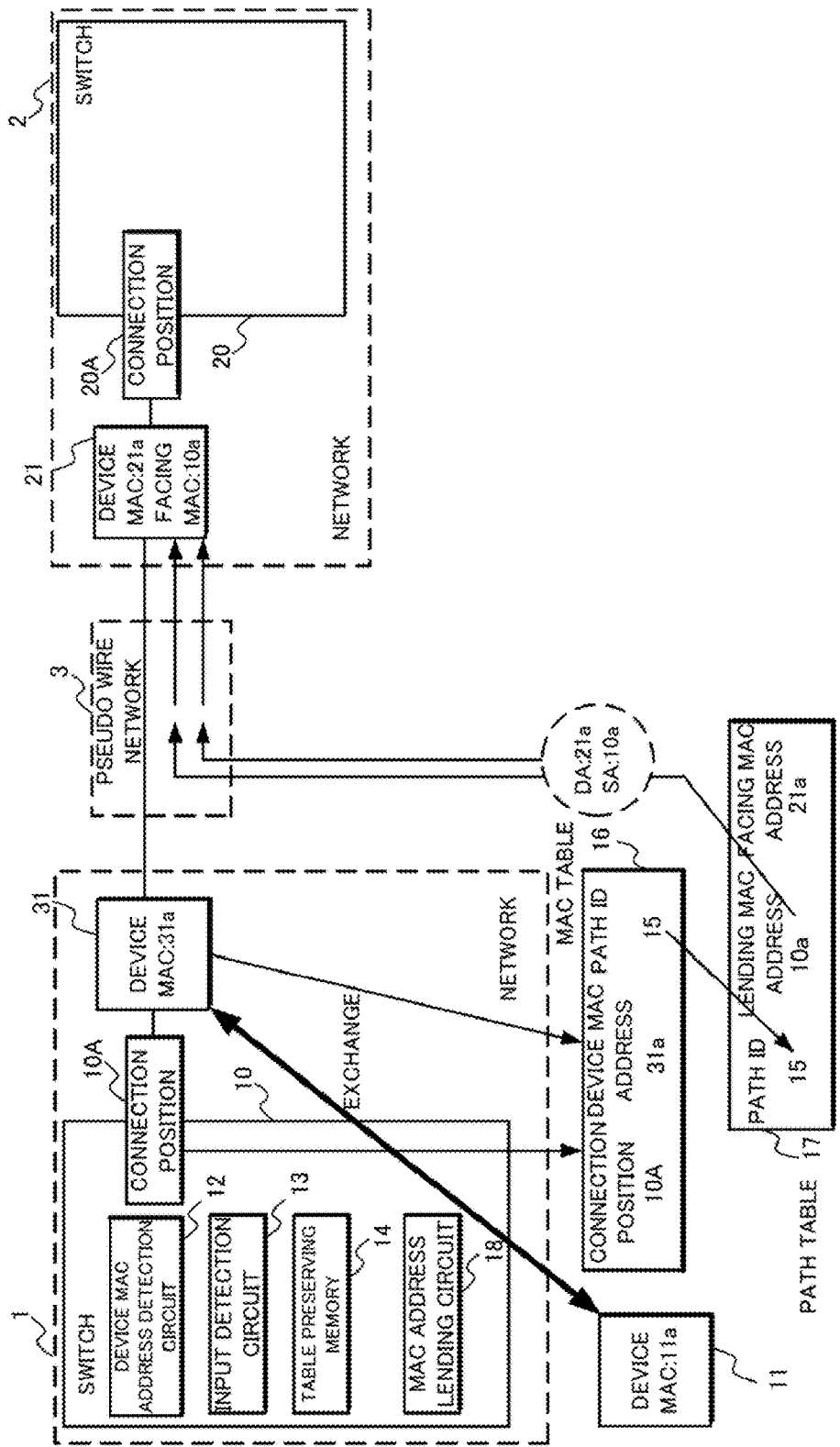
FIG. 4 is a diagram for use in explaining specific operation of the communication system according to the first exemplary embodiment of the present invention.

FIG. 4 is a diagram for use in explaining specific operation of the communication system according to the first exemplary embodiment of the present invention. With reference to FIG. 1 and FIG. 4, specific operation of the communication system according to the first exemplary embodiment of the present invention will be described.

Assume that at an initial state in the present exemplary embodiment, nothing is connected to the switch 10. A this time, there exists only an item of the connection position 10A in the MAC table 16 in the table preserving memory 14.

Next, when the device 11 is connected to the connection position 10A of the switch 10, the device MAC address detection circuit 12 obtains the device MAC address 11a, so that the device MAC address 11a is set at the MAC table 16 in the table preserving memory 14.

For connecting the device 11 connected to the switch 10 to the facing device 21 through the pseudo wire network 3, the facing MAC address 21a is input as a facing MAC address of the path table 17 in the table preserving memory 14 to make the path ID 15 a path ID.

In the switch 10, the input is detected by the input detection circuit 13 and in the path table 17 in the table preserving memory 14, the path ID 15, the lending MAC address 10a lent by the MAC address lending circuit 18 and the facing MAC address 21a are set.

For referring to the path table 17 from the MAC table 16, the switch 10 receives input of the path ID 15 at the connection position 10A of the MAC table 16. In the switch 10, the input is detected by the input detection circuit 13, and at the MAC table 16 in the table preserving memory 14, the connection position 10A, the device MAC address 11a and the path ID 15 are set.

When all the setting is completed, at the time of communication through the device 11, the switch 10 refers to the table preserving memory 14 to transmit a frame with the transmission destination MAC address 21a and the transmission source MAC address 10a. The frame is received at the device 21 of the network 2 through the pseudo wire network 3.

From the device 21 of the network 2, a frame with the transmission destination MAC address 10a and the transmission source MAC address 21a is transmitted and through the reference to the table preserving memory 14 by the switch 10, they are received by the device 11 through the pseudo wire network 3.

Shown in FIG. 4 is operation to be executed when in the course of normal communication through a pseudo wire, the device 11 is removed from the connection position 10A and replaced by a new device 31 having a device MAC address 31a.

When the device 11 is removed from the connection position 10A in the course of communication through a pseudo wire, the device MAC address detection circuit 12 renders the device MAC address in the MAC table 16 yet-to-be-set. During this period, the communication through the pseudo wire ceases.

Next, when the device 31 having the device MAC address 31a is connected to the connection position 10A, the device MAC address 31a is obtained by the device MAC address detection circuit 12 in the switch 10, so that the device MAC address 31a is set at the MAC table 16 in the table preserving memory 14.

Since at this time point, all the elements of the MAC table 16 and the path table 17 are set, the device 31 starts communication with the device 21 in the network 2 through the pseudo wire network 3. Before the device 31 starts communication, no input is made, so that it can be found that communication is automatically recovered by the device MAC address detection circuit 12 and the table preserving memory 14.

Thus, since in the present exemplary embodiment, the facing device 21 of the pseudo wire network 3 fails to refer to a MAC address inherent in the device, communication with a facing side can be recovered only by changing a data base (the MAC table 16 in the table preserving memory 14) of the switch 10 on a transmission side.

Also in the present exemplary embodiment, since the facing device 21 of the pseudo wire network 3 refrains from referring to a MAC address inherent in the device, it will be unnecessary to check the device itself and memorize an inherent MAC address.

Furthermore, in the present exemplary embodiment, since the MAC table 16 and the path table 17 are managed individually, change of pseudo wire setting by input can be flexibly realized.

Figure 5:
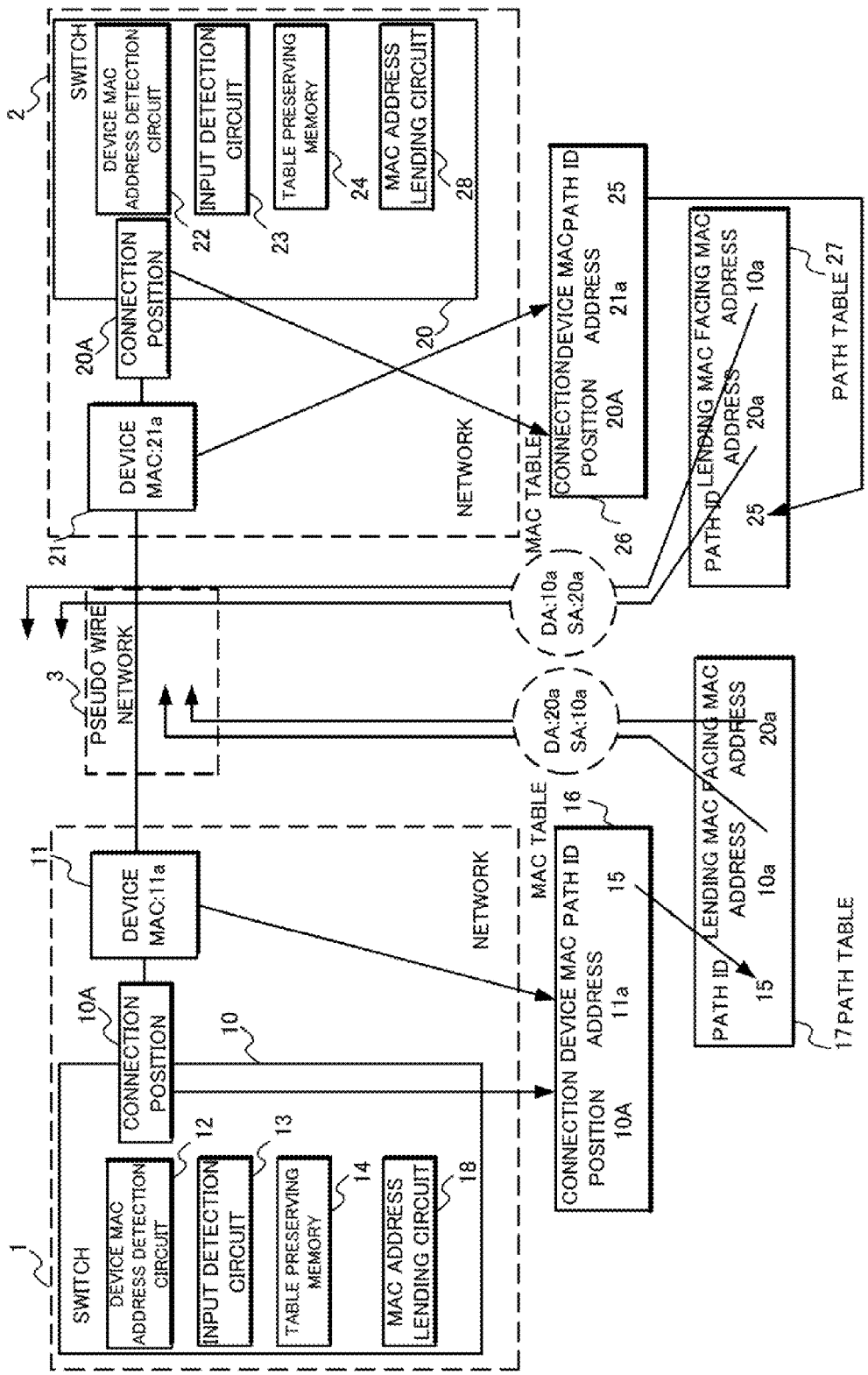
FIG. 5 is a block diagram showing an example of a structure of a communication system according to a second exemplary embodiment of the present invention.

FIG. 5 is a block diagram showing an example of a structure of a communication system according to a second exemplary embodiment of the present invention. Shown in FIG. 5 is an example of a structure in a case where the present invention is applied to both devices executing pseudo wire operation. As to the network 1, only the difference from FIG. 1 is that a facing MAC address of the path table 17 is assumed to be a facing MAC address 20a (in FIG. 1, the facing MAC address 21a), and the remaining part is the same and the same reference numeral is assigned to the same component.

The network 2 is provided with the switch 20 and the device 21 managed by the switch 20, and the device 21 is connected to the connection position 20A of the switch 20. The network 1 and the network 2 are connected through the pseudo wire network 3.

The switch 20 has the connection position 20A and is formed of a device MAC address detection circuit 22, an input detection circuit 23, a table preserving memory 24 and a MAC address lending circuit 28.

A path table 27 has three elements registered as information about connection between the device 21 and the device 11, a connection source MAC address, a connection destination MAC address and a path ID 25 as an ID indicative of a combination of these addresses.

At a stage where the path ID 25 is generated, the MAC address 20a held by the switch 20 is made a lending MAC address by the MAC address lending circuit 28, and the MAC address 10a which is a MAC address of the device 11 is set as a facing MAC address.

In a MAC table 26, at a time point where the switch 20 and the device 21 are connected, the connection position 20A and the device MAC address 21a are recited in the items of the connection position and the device MAC address, respectively, and the path ID 25 is additionally set. The MAC table 26 is allowed to refer to the path table 27 by using the path ID 25 and in the communication by the device 21, used are the facing MAC address 10a (DA: 10a) as a connection destination and the lending MAC address 20a (SA: 20a) as a connection source.

While the communication system shown in FIG. 1 is incapable of coping with replacement of the device 21 and requires a device MAC address as of after change to be checked and re-input to the path table 17, the structure shown in FIG. 5 enables communication to be recovered by the device MAC address detection circuits 12 and 22 not only when one device is replaced but also when both devices are replaced.

Figure 6:
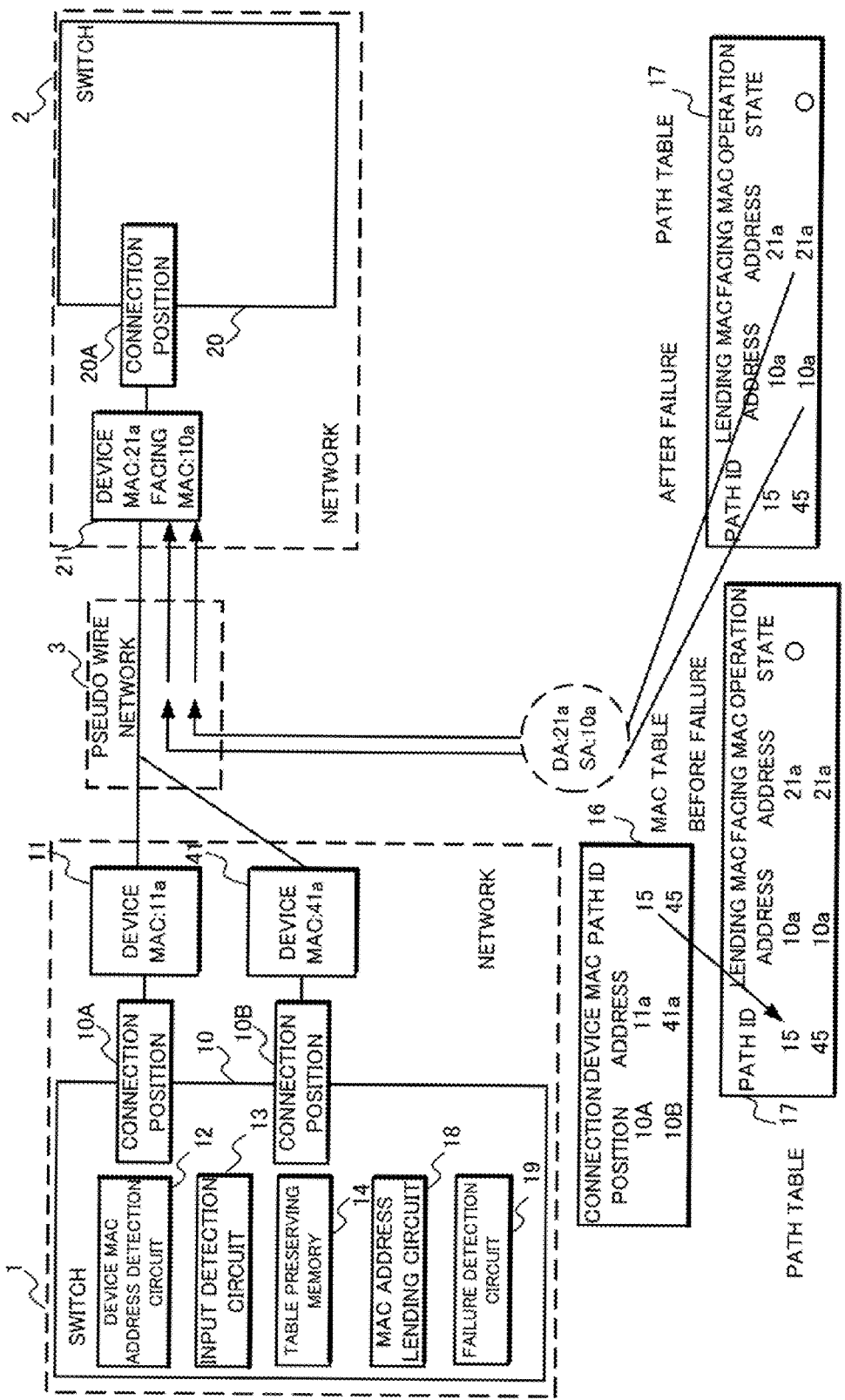
FIG. 6 is a block diagram showing an example of a structure of the communication system according to the second exemplary embodiment of the present invention.

FIG. 6 is a block diagram showing an example of a structure of the communication system according to the second exemplary embodiment of the present invention. Shown in FIG. 6 is a case where pseudo wire setting is duplex. In FIG. 6, the present exemplary embodiment has a connection position 10B added and a failure detection circuit 19 added to the switch 10 shown in FIG. 1 and enables addition of the item of an operation state to the path table 17, as well as enabling the input detection circuit 13 to duplicate a lending MAC address. When a lending MAC address is duplicated, only communication having a path ID whose item of an operation state in the path table 17 has a mark ○ is executed and no communication is executed having a path ID without the mark ○.

The failure detection circuit 19 has a function of monitoring a state of a path ID which is in operation in the path table 17 and upon detection of a failure, accessing the table preserving memory 14 to rewrite the operation state.

In FIG. 6, when a device 41 having a device MAC address 41a is connected to the connection position 10B of the switch 10, the connection position 10B, the device MAC address 41a and a path ID 45 are set at the MAC table 16, and the path ID 45, the lending MAC address 10a, the facing MAC address 21a and invalidity of an operation state are set at the path table 17. Assume that while the device 11 currently communicates with the device 21 through the pseudo wire network 3 based on the above-described operation state, the device 11 develops a fault.

Upon detecting a failure of the device 11, the failure detection circuit 19 invalidates the operation state of the path ID 15 in the path table 17 and at the same time searches the path table 17 and the MAC table 16 for a device having the same lending MAC address as that of the device 11 whose failure is detected and when finding a relevant device, validates the operation state of the found path ID 45.

Thus, even when a device communicating through a pseudo wire develops a fault, the present exemplary embodiment enables the communication to be recovered by combining a lending MAC address which can be duplexed and the failure detection circuit 19.

FIG. 7 is a block diagram showing an example of a structure of a communication system according to a third exemplary embodiment of the present invention. Shown in FIG. 7, as extended operation of the second exemplary embodiment of the present invention shown in FIG. 6, is duplex setting which will operate only in emergency. In FIG. 7, the communication system according to the third exemplary embodiment of the present invention has a network 4 added which is to be connected to the network 1 through the pseudo wire network 3. The network 4 comprises a switch 60 and a device 61 managed by the switch 60, with the device 61 connected to a connection position 60A of the switch 60.

In FIG. 7, it is structured to add an item of priority to the path table 17 of the switch 10, as well as enabling the input detection circuit 13 to duplicate a path ID in the MAC table 16, so that when a plurality of path IDs are set, a path ID whose operation state is valid is used.

By using the addition function, the connection position 10B, the device MAC address 41a, and path IDs 45 and 55 are set at the MAC table 16, and the path ID 55, the lending MAC address 10b, a facing MAC address 61a and validity of an operation state are additionally set at the path table 17.

With the foregoing setting, the device 11 communicates with the device 21 in the network 2 and the device 41 communications with the device 61 in the network 4 both through the pseudo wire network 3.

Assume here that the device 11 develops a fault. Upon detecting the fault, the failure detection circuit 19 invalidates the operation state of the path ID 15 of the path table 17 and at the same time, searches the path table 17 and the MAC table 16 for a device having the same lending MAC address as that of a device whose failure is detected, and when finding the relevant device, refers to priority of its path ID to determine whether it is a path ID whose priority is higher than a path ID of the device being currently in communication, and when the path ID has higher priority, validates the operation state of the relevant path ID. When setting to validate the operation state of the path ID is executed, set the operation state of the path ID of the device which has been communicating so far to be invalid.

Thus, by adding priority to a communication path, the present exemplary embodiment prevents interruption of a crucial path due to a failure which is caused by switching of an operation state.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication system including a network apparatus for controlling communication through a pseudo wire connecting between facing devices that oppose one another, said network apparatus including:
   a path table in which a MAC (Media Access Control) address of said facing device which opposes a device connected to the apparatus itself and a lending MAC address prepared in advance for said pseudo wire are registered in correlation with each other;
   a MAC table in which a MAC address of said device connected to said apparatus itself, and path identification information for specifying a combination of said MAC address of said facing device and said lending MAC address in said path table to which the device refers are registered in correlation with each other; and
   a unit which generates said path identification information and registers the path identification information at said path table at the time of communication through said pseudo wire; wherein
   when a device in communication through said pseudo wire has a change, said network apparatus is configured to reset settings of said pseudo wire based on said path table and said MAC table.

2. The communication system according to claim 1, wherein said network apparatus includes an input detection unit which monitors setting input to said path table and updates registration contents of said path table according to the setting input.

3. The communication system according to claim 2, wherein
   said network apparatus includes a MAC address lending unit which manages lending of said lending MAC address, and which
   when said input detection unit detects new path identification information, lends said lending MAC address by means of said MAC address lending unit.

4. The communication system according to claim 1, wherein said network apparatus includes a MAC address detection unit which monitors a change of said inherent MAC address and updates registration contents of said MAC table every time the change is made.

5. The communication system according to claim 1, wherein said network apparatus is a switch device of a network to which said device belongs.

6. The communication system according to claim 5, wherein said MAC table has registration of a connection position of said device to said switch device, a MAC address inherent in the device and said path identification information and is updated every time said inherent MAC address is changed.

7. A network apparatus for controlling communication through a pseudo wire connecting between facing devices which oppose each other, comprising:
   a path table in which a MAC (Media Access Control) address of said facing device which opposes a device connected to the apparatus itself and a lending MAC address prepared in advance for said pseudo wire are registered in correlation with each other;
   a MAC table in which a MAC address of said device connected to said apparatus itself, and path identification information for specifying a combination of said MAC address of said facing device and said lending MAC address in said path table to which the device refers are registered in correlation with each other; and
   a unit which generates said path identification information and registers the path identification information at said path table at the time of communication through said pseudo wire, wherein
   when a device in communication through said pseudo wire has a change, is configured to reset settings of said pseudo wire based on said path table and said MAC table.

8. The network apparatus according to claim 7, including an input detection unit which monitors setting input to said path table and updates registration contents of said path table according to the setting input.

9. The network apparatus according to claim 8, including a MAC address lending unit which manages lending of said lending MAC address, wherein when said input detection unit detects new path identification information, said MAC address lending unit lends said lending MAC address.

10. The network apparatus according to claim 7, including a MAC address detection unit which monitors a change of said inherent MAC address and updates registration contents of said MAC table every time the change is made.

11. The network apparatus according to claim 7, which is a switch device of a network to which said device belongs.

12. The network apparatus according to claim 11, wherein said MAC table has registration of a connection position of said device to said switch device, a MAC address inherent in the device and said path identification information and is updated every time said inherent MAC address is changed.

13. A communication recovery method for use in a network apparatus for controlling communication through a pseudo wire connecting between facing devices which oppose each other, wherein
   said network apparatus includes
   a path table in which a MAC (Media Access Control) address of said facing device which opposes a device connected to the apparatus itself and a lending MAC address prepared in advance for said pseudo wire are registered in correlation with each other,
   a MAC table in which a MAC address of said device connected to said apparatus itself, and path identification information for specifying a combination MAC address of said facing device and said lending MAC address in said path table to which the device refers are registered in correlation with each other, and which including
   a step of generating said path identification information and registering the path identification information at said path table when communication through said pseudo wire is executed, wherein
   in said network apparatus, when a device in communication through said pseudo wire has a change, settings of said pseudo wire are reset based on said path table and said MAC table.

14. The communication recovery method according to claim 13, including an input detection step of monitoring setting input to said path table and updating registration contents of said path table according to the setting input at said network apparatus.

15. The communication recovery method according to claim 14, including a MAC address lending step of managing lending of said lending MAC address at said network apparatus, wherein
   when said input detection step detects new path identification information, said MAC address lending step lends said lending MAC address.

16. The communication recovery method according to claim 13, including a MAC address detection step of monitoring a change of said inherent MAC address and updating registration contents of said MAC table every time the change is made at said network apparatus.

17. The communication recovery method according to claim 13, wherein said network apparatus is a switch device of a network to which said device belongs.

18. The communication recovery method according to claim 17, wherein said MAC table has registration of a connection position of said device to said switch device, a MAC address inherent in the device and said path identification information and is updated every time said inherent MAC address is changed.

19. A computer readable medium storing a program to be executed by a central processing device in a network apparatus for controlling communication through a pseudo wire connecting between facing devices which oppose each other, wherein
   said network apparatus includes
   a path table in which a MAC (Media Access Control) address of said facing device which opposes a device connected to said network apparatus and a lending MAC address prepared in advance for said pseudo wire are registered in correlation with each other, and
   a MAC table in which a MAC address of said device connected to said network apparatus, and path identification information for specifying a combination of said MAC address of said facing device and said lending MAC address in said path table to which the device refers are registered in correlation with each other, wherein
   said program includes a processing of generating said path identification information and registering the path identification information at said path table when communication through said pseudo wire is executed, and causes said network apparatus to reset, when a device in communication through said pseudo wire has a change, settings of said pseudo wire based on said path table and said MAC table.

* * * * *